US012704211B2

(12) United States Patent
Recchia et al.

(10) Patent No.: US 12,704,211 B2
(45) Date of Patent: Aug. 11, 2026

(54) CATCH BASIN TRAP WITH COLLAPSIBLE OUTLET PIPE CONNECTOR AND METHOD OF MAKING A CATCH BASIN

(71) Applicant: Decast Ltd., Utopia (CA)

(72) Inventors: Mario Recchia, Toronto (CA); Ian Murray Brown, Barrie (CA); Tony Parisi, Barrie (CA)

(73) Assignee: Decast Ltd., Utopia (CA)

( * ) Notice: Subject to any disclaimer, the term of this patent is extended or adjusted under 35 U.S.C. 154(b) by 513 days.

(21) Appl. No.: 17/696,575

(22) Filed: Mar. 16, 2022

(65) Prior Publication Data

US 2022/0299145 A1 Sep. 22, 2022

(30) Foreign Application Priority Data

Mar. 18, 2021 (CA) .................................... 3112128

(51) Int. Cl.
*E03F 1/00* (2006.01)
*B28B 23/00* (2006.01)
(Continued)

(52) U.S. Cl.
CPC ........ *F16L 41/088* (2013.01); *B28B 23/0056* (2013.01); *E03F 1/002* (2013.01)

(58) Field of Classification Search
CPC . F16L 41/088; F16L 27/11; F16L 5/10; E03F 1/002; E03F 5/021; E03F 5/0401;
(Continued)

(56) References Cited

U.S. PATENT DOCUMENTS 142,671 A 9/1873 Boschen
RE5,920 E 6/1874 Meyer
(Continued)

FOREIGN PATENT DOCUMENTS

CA 717806 9/1965
CA 730502 3/1966
(Continued)

OTHER PUBLICATIONS

Canadian Patent Office Action for Application No. 3112128 dated Nov. 16, 2023 (6 pages).

*Primary Examiner* — Amber R Anderson
*Assistant Examiner* — Stacy N Lawson
(74) *Attorney, Agent, or Firm* — Boyle Fredrickson, S.C.

(57) ABSTRACT

A catch basin trap for attachment to an opening in a side wall of a catch basin. The catch basin trap has a body with a front side for facing outside the catch basin, and a back for side facing inside the catch basin. The body defines a chamber, an inlet opening in the back side, and an outlet opening in the front side. A collapsible outlet pipe connector is attached to the outlet opening, configured to be manipulated from a collapsed configuration to an extended configuration defining a discharge end for coupling to an outlet pipe positioned outside the catch basin. The collapsed configuration stows the collapsible outlet pipe connector within the body, and the extended configuration permits watertight coupling of the discharge end to the outlet pipe. A method of installing a catch basin trap, and a method of making a concrete catch basin are also disclosed.

20 Claims, 8 Drawing Sheets

(51) Int. Cl.
*E03F 5/04* (2006.01)
*F16L 41/08* (2006.01)

(58) Field of Classification Search
CPC ....... B28B 7/02; B28B 7/168; B28B 23/0046; B28B 23/0056
See application file for complete search history.

(56) References Cited

U.S. PATENT DOCUMENTS 459,440 A 9/1891 Coleman
522,351 A 7/1894 Phillips
788,721 A 5/1905 Johnson
1,035,480 A 8/1912 Schodde
1,237,068 A 8/1917 Loeb
1,654,247 A 12/1927 Egan
1,654,803 A 1/1928 Griffith
1,693,977 A 12/1928 Egan
1,758,318 A 5/1930 Hayley
1,889,601 A 11/1932 Heinkel
2,086,154 A 7/1937 Boggs
2,263,259 A 11/1941 Boosey
2,550,400 A 4/1951 Boosey
2,550,401 A 4/1951 Boosey
2,745,510 A 5/1956 Hultgren
2,749,303 A 6/1956 Sitton
3,357,593 A 12/1967 Sears, Jr. et al.
3,465,529 A 9/1969 Bernd-Heinz
3,727,953 A 4/1973 Martin et al.
3,789,987 A 2/1974 Malaspina
4,261,823 A 4/1981 Gallagher et al.
4,522,533 A 6/1985 Campbell et al.
4,763,695 A 8/1988 Dooley
4,793,728 A 12/1988 Ellis
4,846,510 A 7/1989 Mikol
4,874,192 A 10/1989 Key
5,101,849 A 4/1992 Richard
5,372,714 A 12/1994 Logue, Jr.
5,433,845 A 7/1995 Greene et al.
5,529,312 A * 6/1996 Skinner ................. F16L 41/088 285/230
5,575,925 A 11/1996 Logue, Jr.
5,683,577 A 11/1997 Nurse, Jr.
5,746,911 A 5/1998 Pank
5,753,115 A 5/1998 Monteith
5,820,762 A 10/1998 Bamer et al.
5,849,181 A 12/1998 Monteith
5,876,039 A * 3/1999 Skinner ..................... F16L 5/10 285/23
5,980,740 A 11/1999 Harms et al.
6,126,817 A 10/2000 Duran et al.
6,132,603 A 10/2000 Mokrzycki et al.
6,394,505 B1 5/2002 Schmucki et al.
6,460,860 B2 * 10/2002 Gavin ..................... F16L 21/03 52/220.8
6,749,746 B2 6/2004 Mokrzycki
7,028,972 B2 4/2006 Miller et al.
7,686,961 B1 3/2010 Glynne
7,827,665 B2 * 11/2010 Happel ............... B28B 23/0043 277/316
10,745,900 B2 8/2020 Recchia
2003/0038429 A1 * 2/2003 Miller ..................... F16L 5/025 277/617
2003/0218304 A1 * 11/2003 Westhoff ................... F16L 5/10 277/604
2004/0222599 A1 * 11/2004 Skinner ..................... F16L 5/10 277/619
2015/0114503 A1 4/2015 Fallot et al.
2016/0116090 A1 4/2016 Poyser
2016/0281345 A1 * 9/2016 Miller .................... F16J 15/027
2019/0078309 A1 * 3/2019 Recchia .................. E03F 1/002

FOREIGN PATENT DOCUMENTS

JP 2017089094 5/2017
KR 100625830 9/2006

* cited by examiner

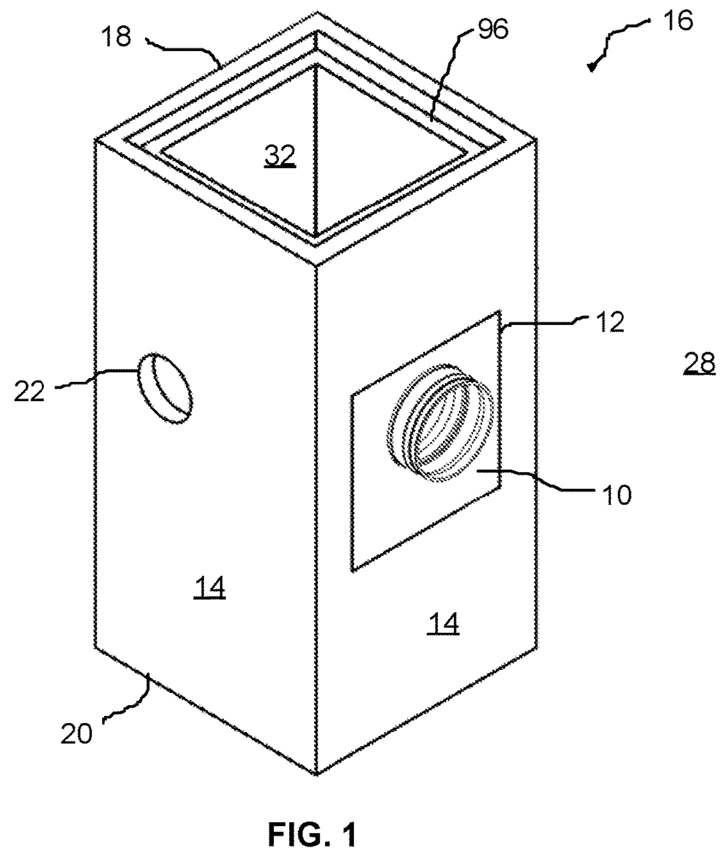
FIG. 1
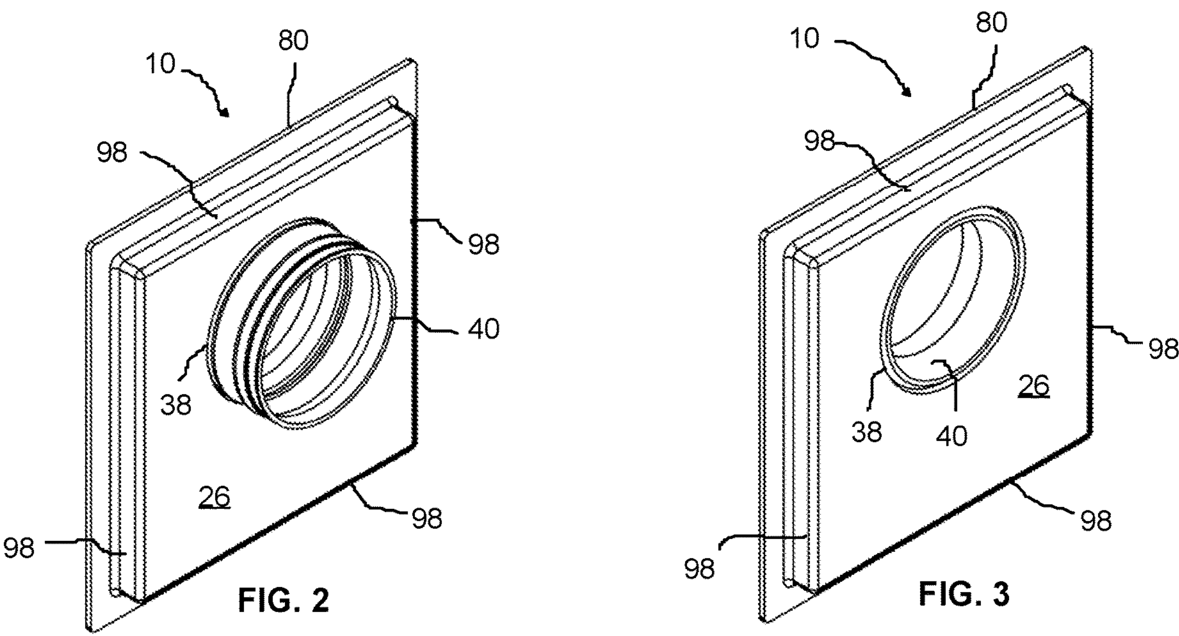
FIG. 2
FIG. 3

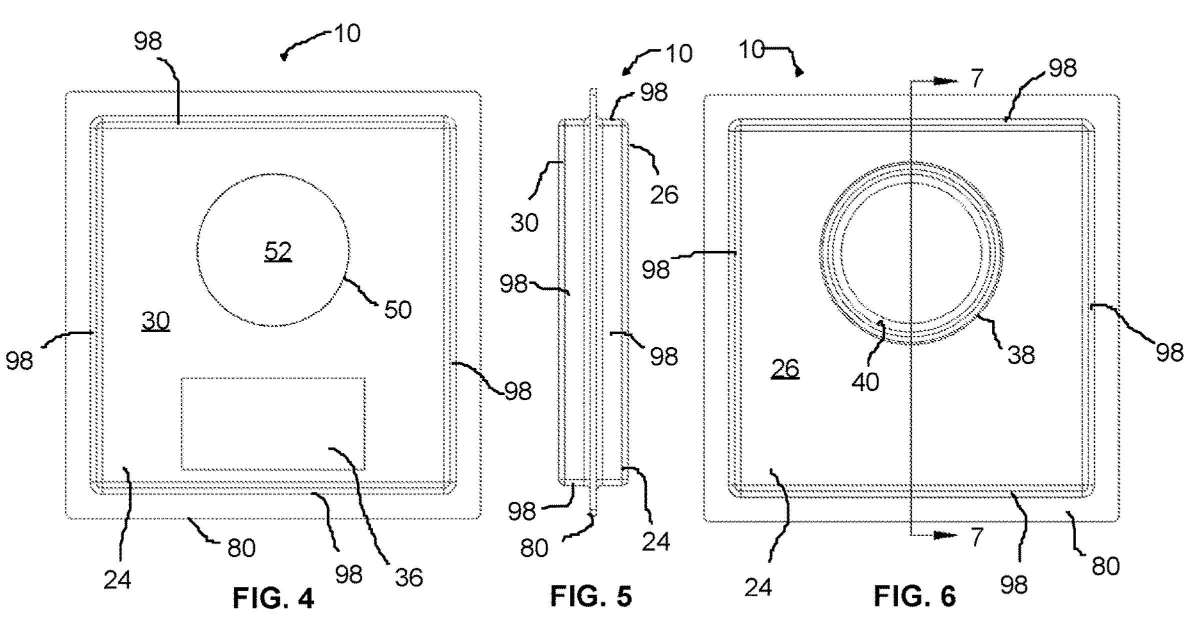
FIG. 4
FIG. 5
FIG. 6
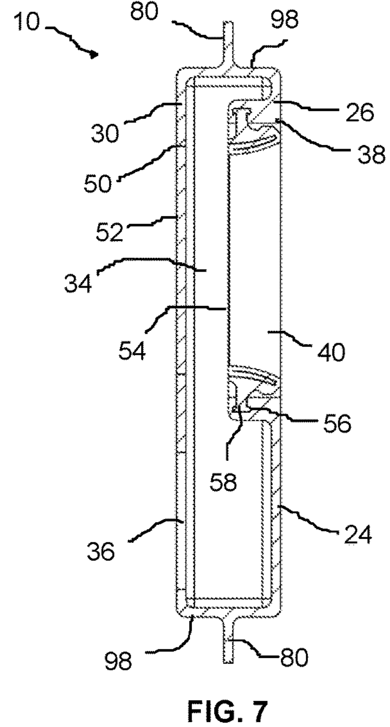
FIG. 7
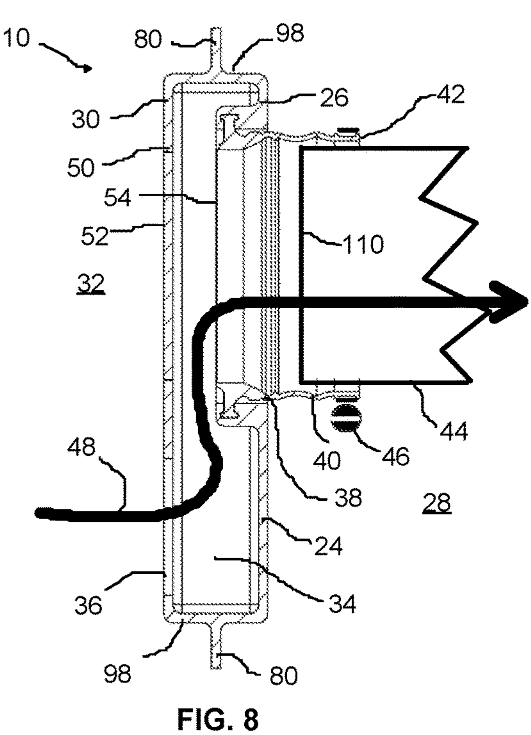
FIG. 8

10
80
98
98
40
98
26
98

10
22
98
98
98
26
80
22
98

80
10
24
98
47
50
40
52
54
42
38
47
30
26
36
34
98
80

10
80
98
52
24
50
42
40
36
98
26
98

10
80
98
50
52
40
54
38
30
26
34
36
24
98
80

CATCH BASIN TRAP WITH COLLAPSIBLE OUTLET PIPE CONNECTOR AND METHOD OF MAKING A CATCH BASIN

CROSS REFERENCE TO RELATED APPLICATION

This invention claims priority to Canadian Patent Application number 3,112,128, filed Mar. 18, 2021, the content of which is hereby incorporated by reference in its entirety.

FIELD OF THE INVENTION

The present invention relates to the field of concrete catch basins. More particularly, the present invention relates to a catch basin trap for the outlet of a catch basin, which is attachable to an opening in the side wall of the catch basin. The present invention also relates to a method of making a concrete catch basin with a catch basin trap attached to an opening formed in its side wall.

BACKGROUND OF THE INVENTION

Catch basins are large concrete structures buried in the ground and used to collect drainage water. They typically have an opening in one side wall to which may be coupled an outflow or outlet pipe of a drainage system. A trap is often provided at the opening in order to prevent floating pollutants, such as gas, oil, leaves and branches, from entering the outlet pipe and possibly plugging the pipe. Such catch basin traps may also provide a water "plug" for preventing sewer gases from entering the catch basin from the outlet pipe. This reduces offensive odors in the area of the catch basin. Such catch basin traps are typically associated with the side wall of a catch basin. They generally have an inlet for receiving drainage water from the interior of the catch basin, an outlet for passing the drainage water to an outlet pipe located outside of the catch basin, and a pathway for the drainage water between the inlet and the outlet.

Typically, a rigid connector is provided at the outlet for coupling to the outlet pipe. Such an outlet pipe connector is often formed integrally with the body of the catch basin trap, and so is made from the same rigid material as the rest of the catch basin trap. The outlet pipe connector is typically adapted to slidably receive the inlet end of the outlet pipe therearound with a sealing friction fit, and the coupling is maintained by the ground that is put over the outlet pipe during installation. Catch basin traps are often configured with outlet pipe connectors that will extend perpendicular to the side wall of the catch basin when installed. In some cases catch basin traps are configured with outlet pipe connectors which are angled downwards for mating with downwardly angled outlet pipes.

Generally speaking, prior art catch basin traps tend to work well when installed properly and as intended by the manufacturer, however, they may be prone to failure when installed improperly. For example, in installations of such prior art catch basin traps where the ground has not been properly prepared and compacted prior to setting the catch basin and/or laying the outlet pipe, the outlet pipe and/or the catch basin may move relative to one another as the ground under one or both settles. This relative movement of the outlet pipe and/or the catch basin results in the outlet pipe becoming damaged or decoupled from the catch basin trap, or the pipe connecting section of the catch basin trap cracks, breaks or is sheared completely off of the catch basin trap. The result of any one of these failures is leakage of drainage water from inside the catch basin to outside of the catch basin into the ground at the location of the failed coupling between the outlet pipe and the catch basin trap.

U.S. Pat. No. 10,745,900 provides a solution to the problems associated with relative movement between an outlet pipe and a catch basin. The U.S. Pat. No. 10,745,900 patent teaches a catch basin trap having a flexible outlet pipe connector extending outwardly from the outlet opening of the catch basin trap. The outwardly extending flexible outlet pipe connector is configured for watertight coupling to an outlet pipe positioned outside of the catch basin, at a plurality of angles and positions relative to the catch basin trap. Furthermore, the flexible outlet pipe connector allows the catch basin trap to accommodate angular and transpositional deviations of the outlet pipe resulting from settling of the ground after installation.

However, the catch basin trap taught in the U.S. Pat. No. 10,745,900 patent is not without its own problems. For one, if the catch basin trap is mounted to the catch basin at the factory, the outwardly extending flexible outlet pipe connector is susceptible to being damaged when transporting the catch basin to the work site. This problem is not unique to the catch basin trap described in the U.S. Pat. No. 10,745,900 patent, but afflicts all catch basin traps with an outwardly extending outlet pipe connector. When any outlet pipe connector sticks out of the catch basin, it can get crushed, abraded, pinched, pulled, or otherwise damaged unless great care is taken to protect the catch basin trap, or give sufficient clearance, when transporting the catch basins. The risk of damage is significant enough that the recommended practice is to avoid transporting the catch basin with the catch basin trap mounted thereto, and instead mount the catch basin trap to the catch basin only after the catch basin has been transported to the work site.

Another problem with the U.S. Pat. No. 10,745,900 catch basin trap, and other catch basin traps with outwardly extending outlet pipe connectors, is that they are configured for mounting in a side wall opening of a prefabricated catch basin. The outwardly extending flexible outlet pipe connector of a conventional catch basin trap precludes a simple and cost effective method of casting the concrete catch basin with the catch basin trap retained within the side wall of the cured concrete catch basin. The outwardly extending flexible outlet pipe connector interferes with conventional molds used to cast concrete catch basins.

Examples of prior art drains, catch basins, and catch basin traps include: U.S. Pat. Nos. 142,671; RE5,920; 459,440; 522,351; 788,721; 1,035,480; 1,237,068; 1,654,247; 1,654,803; 1,693,977; 1,758,318; 1,889,601; 2,086,154; 2,263,259; 2,550,400; 2,550,401; 2,745,510; 2,749,303; 3,789,987; 4,261,823; 4,522,533; 5,101,849; 5,372,714; 5,433,845; 5,575,925; 5,683,577; 5,746,911; 5,753,115; 5,820,762; 5,849,181; 5,980,740; 6,126,817, 6,132,603; 6,749,746; and 7,686,961; and Canadian Pat. Nos. 717,806; and 730,502.

Examples of prior art couplings include: U.S. Pat. Nos. 3,357,593, 3,465,529; 3,727,953; 4,763,695, 4,793,728; 4,846,510; 4,874,192; 6,394,505; 7,028,972, and 7,827,665; and U.S. Patent Publication Nos. 2015-0114503; and 2016-0116090.

Accordingly, there is a continuing need for improvements in catch basin traps.

SUMMARY OF THE INVENTION

What is desired therefore, is a catch basin trap which overcomes at least some of the above described problems associated with prior art catch basin traps.

What is desired is a catch basin trap which will facilitate installation of catch basin traps, and/or mitigate problems associated with an improper installation leading to some movement of an outlet pipe or the catch basin relative to the other, during settling of the ground underneath, after the installation.

Additionally, it is desired that the catch basin trap will facilitate transport of a catch basin with the catch basin trap mounted in a side wall of the catch basin, which mitigates the risk of the flexible outlet pipe connector being damaged during transport of the catch basin.

Furthermore, a method of making a concrete catch basin is desired, wherein the concrete catch basin is cast in a mold, with the catch basin trap held in a casting position inside the mold, to be held in the side wall of the concrete catch basin, once the concrete has cured.

Accordingly, an embodiment of the present invention is directed to a catch basin trap having a relatively simple and inexpensive construction, which may be mounted in an opening formed in a side wall of a prefabricated catch basin, and watertight coupled to an outlet pipe positioned outside of the catch basin in a range of predetermined angles and/or positions relative to the catch basin trap. Preferably, the catch basin trap includes a collapsible, flexible outlet pipe connector, which may be manipulated by a user between an in use, extended configuration, and a stowed, collapsed configuration. In the extended configuration, the collapsible, flexible outlet pipe connector sticks out from the body of the catch basin trap. However, in the stowed, collapsed configuration, the collapsible, flexible outlet pipe connector is positioned out of the way, being confined within the body of the catch basin trap, where it remains protected by the body. Afterwards, when the catch basin is transported to the work site for installation, the collapsible, flexible outlet pipe connector may be manipulated to the extended configuration.

Another embodiment of the present invention is directed to a catch basin trap configured to be used in a concrete catch basin trap molding process, wherein the concrete catch basin is cast in a mold, with the catch basin trap held in a casting position inside the mold, to be held in the side wall of the concrete catch basin, once the concrete has cured. Preferably, the catch basin trap includes a collapsible outlet pipe connector, which may be manipulated by a user between an in use, extended configuration, and a stowed, collapsed configuration. In the extended configuration, the collapsible outlet pipe connector sticks out from the body of the catch basin trap. However, in the stowed, collapsed configuration, the collapsible outlet pipe connector is positioned out of the way, being confined within the body of the catch basin trap, so that it will fit within the mold, and will not otherwise interfere with the molding. Afterwards, when the cast concrete catch basin is cured, and transported to the work site for installation, the collapsible, flexible outlet pipe connector may be manipulated to the extended configuration.

Preferably, the collapsible outlet pipe connector is attached to the outlet opening in the body of the catch basin trap, and is adapted for watertight coupling to an outlet pipe, when in the extended configuration. Furthermore, when in the extended configuration, the preferred collapsible outlet pipe connector is sufficiently flexible to couple the catch basin trap to an outlet pipe positioned in a range of predetermined angles relative to the catch basin trap, and to accommodate an angular deviation of the outlet pipe resulting from movement of the pipe due to settling of the ground after the installation.

To accommodate the installation angles and positions of the outlet pipe relative to the catch basin trap, and potential deviations therefrom after installation, the preferred collapsible outlet pipe connector is deformable, when in the extended configuration, from a native shape adapted for the watertight coupling to the outlet pipe at a first angle or a first position relative to the catch basin trap, to a deformed shape adapted for the watertight coupling to the outlet pipe at a second angle or a second position relative to the catch basin trap.

Accordingly, the preferred collapsible outlet pipe connector may be formed from flexible, rubber, or rubber-like materials which allow the collapsible outlet pipe connector to be manipulated to and from its collapsed and extended configurations, in addition to being deformable when in the extended configuration its native extended shape to a deformed extended shape.

Therefore, in accordance with one aspect of the present intention, there is disclosed a catch basin trap for attachment to an opening in a side wall of a catch basin, said catch basin trap comprising:

- a body having a front side for facing outwardly to outside of said catch basin, and a back side for facing inwardly to inside of said catch basin, said body defining a chamber;
- an inlet opening in said back side of said body for receiving drainage water from said inside of said catch basin;
- an outlet opening in said front side of said body;
- a collapsible outlet pipe connector attached to said outlet opening, said collapsible outlet pipe connector being configured to be manipulated from a collapsed configuration to an extended configuration defining a discharge end adapted for coupling to an outlet pipe positioned outside said catch basin; and
- a water flow path for said drainage water from said inlet opening to said collapsible outlet pipe connector, via said chamber, and said outlet opening;
- wherein said collapsed configuration stows said collapsible outlet pipe connector within said body, and said extended configuration permits watertight coupling of said discharge end of said collapsible outlet pipe connector to said outlet pipe.

In accordance with another aspect of the present invention, there is disclosed a method of installing a catch basin trap, said method comprising the steps of:

- providing said catch basin trap defined above;
- attaching said catch basin trap to said opening in said side wall of said catch basin;
- manipulating said collapsible outlet pipe connector from said collapsed configuration to said extended configuration;
- sliding said discharge end of said extended collapsible outlet pipe connector over an inlet end of said outlet pipe to form said watertight coupling.

In accordance with yet another aspect of the present invention, there is disclosed a method of making a concrete catch basin, said method comprising the steps of:

- providing said catch basin trap defined above;
- ensuring that said collapsible outlet pipe connector is in said collapsed configuration;
- assembling together an outer mold jacket and an inner mold form of a mold for casting said concrete catch basin, said assembly creating a mold space that is sized and shaped to form said side wall of said concrete catch basin, when filled with concrete;

positioning said catch basin trap within said mold space; and filling said mold space with said concrete to form said side wall and said side wall opening around said catch basin trap;

wherein said catch basin trap is held in said opening.

BRIEF DESCRIPTION OF THE DRAWINGS

Reference will now be made to the preferred embodiments of the present invention with reference, by way of example only, to the following drawings in which:

FIG. 1 is a perspective view of a catch basin trap retained in a side wall of a concrete catch basin, according to an embodiment of the present invention;

FIG. 2 is a perspective view of the catch basin trap of FIG. 1, showing a collapsible, flexible outlet pipe connector in an extended configuration;

FIG. 3 is a perspective view of the catch basin trap of FIG. 2, showing the collapsible, flexible outlet pipe connector in a collapsed configuration;

FIG. 4 is a rear view of the catch basin trap of FIG. 3;

FIG. 5 is a side view of the catch basin trap of FIG. 3;

FIG. 6 is a front view the catch basin trap of FIG. 3;

FIG. 7 is a cross-sectional view taken along line 7-7 of FIG. 6, showing the collapsible, flexible outlet pipe connector in the collapsed configuration;

FIG. 8 is a cross-sectional view similar to FIG. 7, except that the collapsible, flexible outlet pipe connector is shown in the extended configuration;

DETAILED DESCRIPTION OF THE PREFERRED EMBODIMENTS

Figure 9:
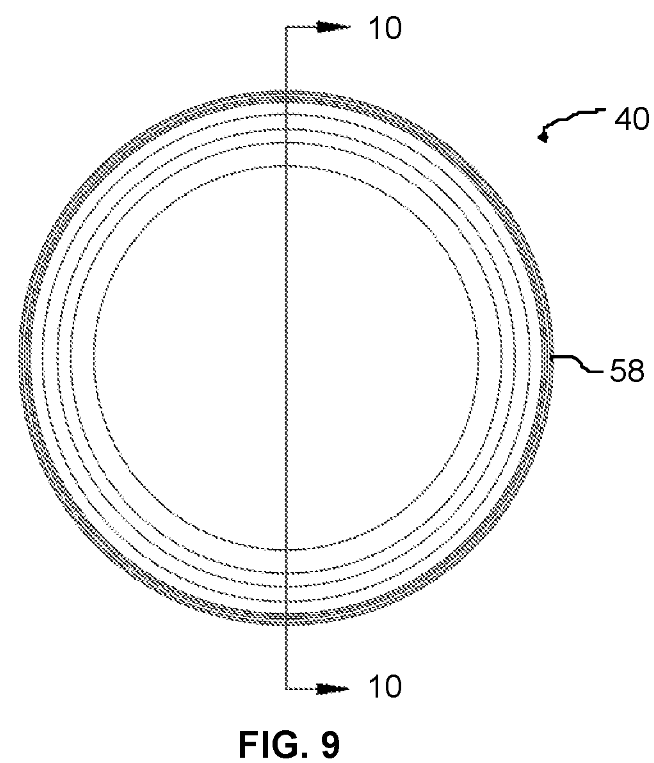
FIG. 9 is front view of the flexible, collapsible outlet pipe connector of FIG. 7, removed from the body of the catch basin trap.

The present invention is described in more detail with reference to exemplary embodiments thereof as shown in the appended drawings. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

A catch basin trap 10 according to an embodiment of the present invention is shown in FIGS. 1 to 8.

In FIG. 1, the catch basin trap 10 is shown attached to an opening 12 in a side wall 14 of a catch basin 16. In this example, the catch basin 16 is rectangular in shape, and has an open top 18, and a closed bottom 20. Additional openings 22 may be provided in one or more side walls 14, as is known in the art. For example, the additional openings 22 may be provide for connecting to sub-drain.

Referring now to FIGS. 2 to 8, the catch basin trap 10 has a body 24 having a front side 26 for facing outwardly to outside 28 of the catch basin 16, and a back side 30 for facing inwardly to inside 32 of the catch basin 16. The body 24 defines a chamber 34. An inlet opening 36 is provided in the back side 30 of the body 24 for receiving drainage water from inside 32 of the catch basin 16, and an outlet opening 38 is provided in the front side 26 of the body 24. Although the body 24 of the catch basin trap 10 is shown in these examples as having a substantially square shape, it is not so limited. For example, the body 24 may have a front side 26 or a back side 30 that is shaped substantially as a circle, an ellipse, a square, a rectangle, a triangle, or other polygonal shape. All such embodiments are comprehended by the present invention.

A collapsible outlet pipe connector 40 is attached to the outlet opening 38, as best seen in FIGS. 7 and 8. As will be explained in more detail below, the collapsible outlet pipe connector 40 is configured to be manipulated from a collapsed configuration (shown by way of example in FIG. 7), to an extended configuration (shown by way of example in FIG. 8). Preferably, the collapsible outlet pipe connector 40 may also be manipulated from the extended configuration to the collapsed configuration. The extended configuration defines a discharge end 42, which is adapted for coupling to an outlet pipe 44 positioned outside of the catch basin 16, when in use.

Preferably, the collapsed configuration stows the collapsible outlet pipe connector 40 within the body 24, to keep it out of the way, and protected from damage, whether pre-installation, or post-installation in a catch basin 16. The collapsed configuration also reduces the overall size of the catch basin trap 10, which is advantageous for packaging, storing, and transporting the catch basin traps 10. Furthermore, the collapsed configuration permits that catch basin trap 10 to be used in a novel method of making a catch basin 16, as discussed in more detail below.

The extended configuration, on the other hand, permits watertight coupling of the discharge end 42 of the collapsible outlet pipe connector 40 to the outlet pipe 44, when in use, as mentioned above. A plurality of ridges (not shown) may be provided on the inner surface of the collapsible outlet pipe connector 40 at the discharge end 42 to grip the outlet pipe 44. Preferably, a mechanical clamp, such as for example an expandable ring gear clamp 46, may be used to secure the watertight coupling of the collapsible outlet pipe connector 40 to the outlet pipe 44. The expandable ring gear clamp 46 may be retained in position at the discharge end 42 with a retaining groove or channel 47 formed in the outer surface of the collapsible outlet pipe connector 40.

As illustrated in FIG. 8, the catch basin trap 10 provides a water flow path 48 for drainage water from the inlet opening 36 to the collapsible outlet pipe connector 40, via the chamber 34, and the outlet opening 38. In this way, when the catch basin trap 10 is attached to the opening 12 in the side wall 14 of the catch basin 16, and the discharge end 42 of the collapsible outlet pipe connector 40 is coupled to the outlet pipe 44 (after being manipulated to the extended configuration), drainage water from the inside 32 of the catch basin 16 can flow through the catch basin trap 10 along the water flow path 48 to the outlet pipe 44 located outside 28 of the catch basin 16.

As best seen in FIGS. 7 and 8, the body 24 of the catch basin trap 10 may preferably be formed as one unitary piece, by forming the body 24 out of plastic, in a molding process. PVC, ABS, or any other commonly used thermoplastic that is suitable for the desired molding may be used. Preferably, an access opening 50 may be provided in the back side 30 of the body 24 to allow for cleaning of the chamber 34, the outlet opening 38, the collapsible outlet pipe connector 40, and/or the outlet pipe 44. If an access opening 50 is provided, a cover 52 should be releasably attached to the access opening 50 to cover the access opening when the catch basin trap 10 is in use.

With continued reference to FIGS. 7 and 8, the inlet end 54 of the collapsible outlet pipe connector 40 is attached to the outlet opening 38 along its periphery, forming a watertight seal between the outlet opening 38 and the collapsible outlet pipe connector 40. In this example, the collapsible outlet pipe connector 40 is attached to the inlet end 54 using a groove or channel 56 to grip a mating tang 58 at the inlet end 54, thereby mechanically securing the collapsible outlet pipe connector 40 to the outlet opening 38, as best seen in FIG. 7. Good results have been achieved by forming the channel 56 and mating tang 58 with T-shaped cross-sections. Alternately, the collapsible outlet pipe connector 40 may be attached to the outlet opening 38 using an adhesive, such as for example 3M® Rubber & Vinyl 80 Spray Adhesive, or similar. Alternately still, the collapsible outlet pipe connector 40 may be attached to the outlet opening 38 using an expandable ring gear clamp 46 to mechanically secure the inlet end 54 to the outlet opening 38. As another example, the collapsible outlet pipe connector 40 may be co-molded with the body 24 for attachment to the outlet opening 38. However, as the person skilled in the art will recognize, there are many other methods for attaching the collapsible outlet pipe connector 40 to the outlet opening 38. All such methods of attachment are comprehended by the present invention.

Figure 10:
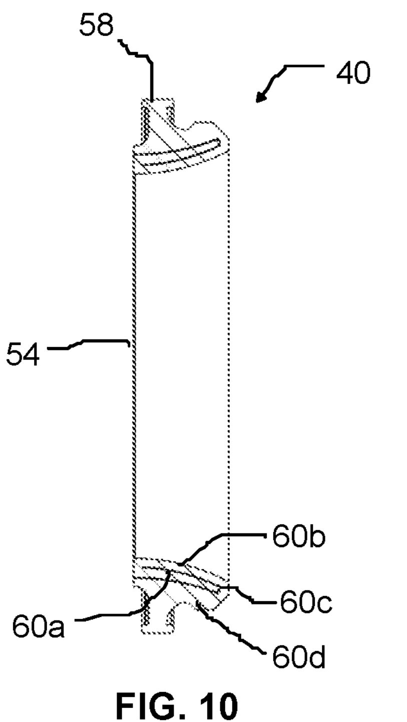
FIG. 10 is a cross-sectional view taken along line 10-10 of FIG. 9.
Figure 11:
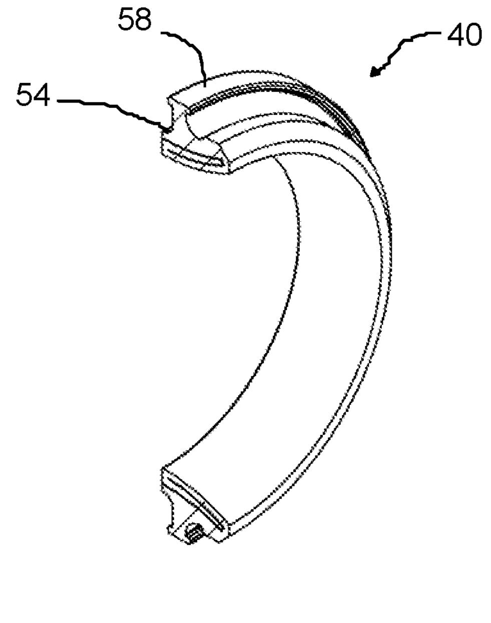
FIG. 11 is a perspective view of FIG. 10.

Referring now to FIGS. 9 to 11, the collapsible outlet pipe connector 40 is shown apart from the body 24 of the catch basin trap 10, in the collapsed configuration, according to an embodiment of the present invention. Preferably, the collapsible outlet pipe connector 40 may be constructed from rubber, however other rubber-like materials may also be used. For example, the material of the collapsible outlet pipe connector 40 may be ethylene propylene diene monomer (EPDM) rubber, or nitrile rubber. What is important is that the material allows the collapsible outlet pipe connector 40 to be a flexible and sufficiently elastic to allow the discharge end 42 to be stretched and spring back to seal against the outlet pipe 44. Preferably, the material selected for the collapsible outlet pipe connector 40 may conform to the standards set out in Canadian Standards Association (CSA) A257.3 or American Society for Testing Materials (ASTM) C923.

As can be seen, the preferred collapsible outlet pipe connector is 40 is round, and has a T-shaped tang 58 positioned continuously about its periphery for attachment to the outlet opening 38 via a matching T-shaped channel 56, as mentioned above. However, the collapsible outlet pipe connector 40 need not be round. It is contemplated that the shape of the collapsible outlet pipe connector 40 may be an ellipse, a square, a triangular, or other polygonal shape in cross-sections perpendicular to its longitudinal axis. What is important is that the collapsible outlet pipe connector 40 is configured to roll, or fold back on itself when the collapsible outlet pipe connector 40 is manipulated from the extended configuration to the collapsed configuration. Preferably, when the collapsible outlet pipe connector 40 is in the collapsed configuration, no portion of the collapsible outlet pipe connector 40 projects past the front side 26 of the body 24, as best seen in FIGS. 3 and 7.

Figure 12:
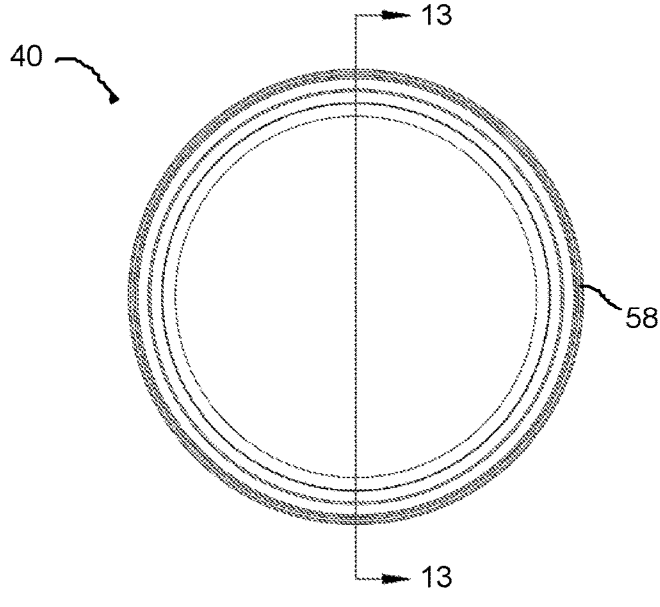
FIG. 12 is a front view of the flexible, collapsible outlet pipe connector of FIG. 8, removed from the body of the catch basin trap.
Figure 13:
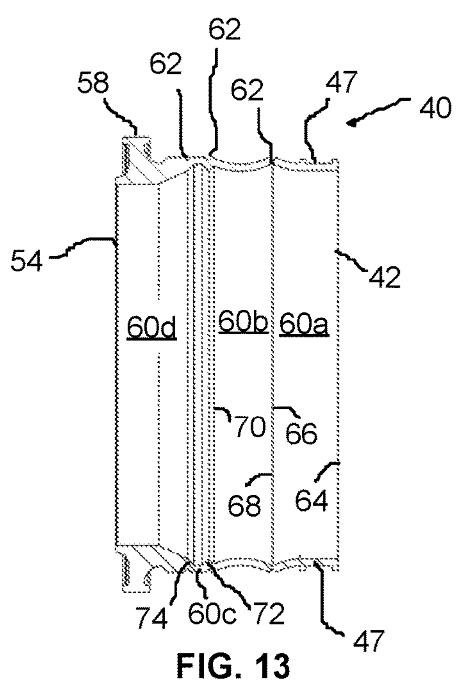
FIG. 13 is a cross-sectional view taken along line 13-13 of FIG. 12.
Figure 14:
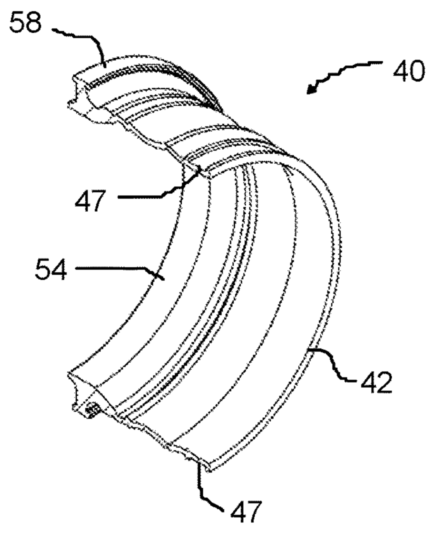
FIG. 14 is a perspective view of FIG. 13.

FIGS. 12 to 14, show the collapsible outlet pipe connector 40 apart from the body 24 of the catch basin trap 10, in the extended configuration, according to an embodiment of the present invention. The collapsible outlet pipe connector 40 is configured to be unrolled, or unfolded from collapsed configuration shown in FIGS. 9 to 11 above, to the extended configuration shown in these FIGS. 12 to 14. Hoop tension will normally maintain the collapsible outlet pipe connector 40 in the extended configuration, although exerting pressure on the discharge end 42 can cause the collapsible outlet pipe connector 40 to fold to the collapsed configuration.

Preferably, when the collapsible outlet pipe connector 40 is in the extended configuration, the collapsible outlet pipe connector 40 may be sized to extend about 10.0 cm from the front side 26 of the body 24, and present a discharge end 42 having an inside diameter of about 27.4 cm for accommodating an outlet pipe 44 having a 25 cm nominal pipe size, for example. Preferably, the discharge end 42 may be sized to match the outlet pipe, which typically comes in 15.2, 20.3, or 25 cm nominal pipe sizes. A retaining groove or channel 47 may be formed in the outer surface of the collapsible outlet pipe connector 40 at the discharge end 42 for retaining a mechanical clamp, such as for example an expandable ring gear clamp 46, as mentioned above.

Referring now to FIG. 13, a preferred collapsible outlet pipe connector 40 is formed from a plurality of annular outlet pipe connector sections 60*a*, 60*b*, 60*c*, and 60*d*. Although four such outlet pipe connector sections are shown in this example, more or fewer outlet pipe connector sections may be used in other embodiments of the present invention. Each of the outlet pipe connector sections is joined to an adjacent outlet pipe connector section by a living hinge 62. Preferably, each living hinge 62 may be a ring of material having a thickness that is less than a thickness of the material in the adjacent outlet pipe connector sections joined together by the living hinge 62. Thinning of the material in the ring increases its flexibility relative to the thicker material in the adjacent outlet pipe connector sections, allowing it to function as a living hinge. As such the living hinges 62 may present as annular grooves or weakening in the material. Preferably, the living hinges 62 may be formed during the molding process used to make the collapsible outlet pipe connector 40. However, the living hinges 62 may be formed in a separate step, after the collapsible outlet pipe connector 40 is removed from the mold, in known ways. For example, the living hinges 62 may be scored or cut into the collapsible outlet pipe connector 40 after being removed from the mold.

In the example shown in FIG. 13, the collapsible outlet pipe connector 40 has a first outlet pipe connector section 60*a* having a first end 64 and a second end 66, and a second outlet pipe connector section 60*b* having a first end 68 and a second end 70. The first end 64 of the first outlet pipe connector is the discharge end 42. The second end 66 of the first outlet pipe connector section 60*a* is attached to the first end 68 of the second outlet pipe connector section 60*b* by a first living hinge 62 to allow the first outlet pipe connector section 60*a* to fold back toward the second outlet pipe connector section 60*b*. Preferably, the first outlet pipe connector section 60*a* may fold up against the surface of the second outlet pipe connector section 60*b*, as best seen in FIG. 10.

Additionally, the collapsible outlet pipe connector 40 has a third outlet pipe connector section 60*c* having a first end 72 and a second end 74. The first end 72 of the third outlet pipe connector section 60*c* is attached to the second end 70 of the second outlet pipe connector section 60*b* by a second living hinge 62, to allow the folded first and second outlet pipe connector sections 60*a*,60*b* to fold back toward the third outlet pipe connector section 60*c*.

However, the collapsible outlet pipe connector 40 may have one or more additional outlet pipe connector sections attached to the second end 74 of the third outlet pipe connector section 60*c* in series by one or more additional living hinges 62 to allow the folded outlet pipe connector sections to continue folding back toward the next additional outlet pipe connector section in the series. For example, the collapsible outlet pipe connector 40 shown in FIG. 13 has a fourth outlet pipe connector section 60*d* having a first end 76 and a second end 78. The second end of the fourth outlet pipe connector section 60*d* is the inlet end 54. The first end 76 of the fourth outlet pipe connector section 60*d* is attached to the second end 74 of the third outlet pipe connector section 60*c* by a third living hinge 62, to allow the folded first, second, and third outlet pipe connector sections 60*a*, 60*b*,60*c* to fold back toward the fourth outlet pipe connector section 60*d*.

Preferably, the folded first and second outlet pipe connector sections 60*a*,60*b* may fold up against the surface of the fourth outlet pipe connector section 60*d*, as best seen in FIG. 10. In this example, the third outlet pipe connector section 60*c* is relatively short, being configured to form a space sized to accommodate the thickness of the first outlet pipe connector section 60*a*, when the collapsible outlet pipe connector 40 is manipulated to the collapsed configuration, as best seen in FIG. 10.

Referring back to FIG. 13, one or more of the outlet pipe connector sections may be provided with a scalloped profile to facilitate folding. For example, the first and second outlet pipe connector sections 60*a*,60*b* of the collapsible outlet pipe connector 40 shown in FIG. 13 have scalloped profiles. In other words, the cross-sectional shapes of the first and second outlet pipe connector sections 60*a*,60*b*, along the longitudinal axis of the collapsible outlet pipe connector 40, are curved, as best seen in FIG. 13. In particular, the intermediate portion of the first outlet pipe connector section 60*a*, between its first end 64 and its second end 66, curves toward the longitudinal axis of the collapsible outlet pipe connector 40. Similarly, the intermediate portion of the second outlet pipe connector section 60*b*, between its first end 68 and its second end 70, curves toward the longitudinal axis of the collapsible outlet pipe connector 40. Preferably, the length and amount of curvature of the first and second outlet pipe connector sections 60*a*,60*b* may be substantially the same.

In this example, the scalloped profiles allow the first outlet pipe connector section 60*a* to fold tightly against the surface of the second outlet pipe connector section 60*b*, and in turn the folded first and second outlet pipe connector sections 60*a*,60*b* may fold tightly against the fourth outlet pipe connector section 60*d*, as best seen in FIGS. 10 and 11.

Preferably, the body 24 of the catch basin trap 10 may include a means for attaching the catch basin trap 10 to the opening 12 in the side wall 14 of the catch basin 16. In the example shown in FIGS. 2 to 8, the attachment means is in the form of an upstanding flange 80 extending outwardly from the body 24 continuously around a periphery of the body 24, between the front side 26 and the back side 30 of the body 24. Although the upstanding flange 80 is shown midway between the front side 26 and the back side 30, it need not be. The upstanding flange 80 may be away from the midpoint closer towards the front side 26, or closer to the back side 30 in other embodiments of the present invention.

As will be described in more detail below, the upstanding flange 80 may preferably be configured to be embedded in the side wall 14 of the catch basin 16 during concrete casting of the catch basin 16 in a mold. In particular, the upstanding flange 80 will preferably be sized and shaped to allow the catch basin trap 10 to be held in place in the opening 12 in the side wall 14 by the upstanding flange 80 after the cast concrete catch basin 16 has cured around it. Accordingly, the upstanding flange 80 functions to anchor the catch basin trap 10 in the concrete surrounding the opening 12.

It will be appreciated that the upstanding flange 80 need not be continuous, as depicted in the figures, to anchor the catch basin trap 10 to the concrete catch basin 16. However, it has been found that providing the catch basin trap 10 with a continuous upstanding flange 80, allows the catch basin trap 10 to be embedded in the side wall 14 in a substantially watertight manner. Accordingly, the preferred catch basin trap 10 is continuous, and sized and shaped to form a substantially watertight seal between the body 24 of the catch basin trap 10 and the opening 12 in the side wall 14 of the catch basin 16 when embedded in the side wall 14 during concrete casting of the catch basin 16 with the catch basin trap 10 in a mold. Good results have been obtained with an upstanding flange 80 1.0 cm thick, and extending 5.0 cm from the body 24. Preferably, the upstanding flange 80 may be sized to embed into the concrete surrounding the opening 12 in the side wall 14 in a range from about 2.5 cm to about 10 cm.

Having described preferred embodiments of the catch basin trap 10 above, a new method of making a catch basin 16, incorporating the catch basin trap 10 in an opening 12 in a side wall 14 of the catch basin 16, is discussed next, with reference to FIGS. 15 to 19.

Figure 15:
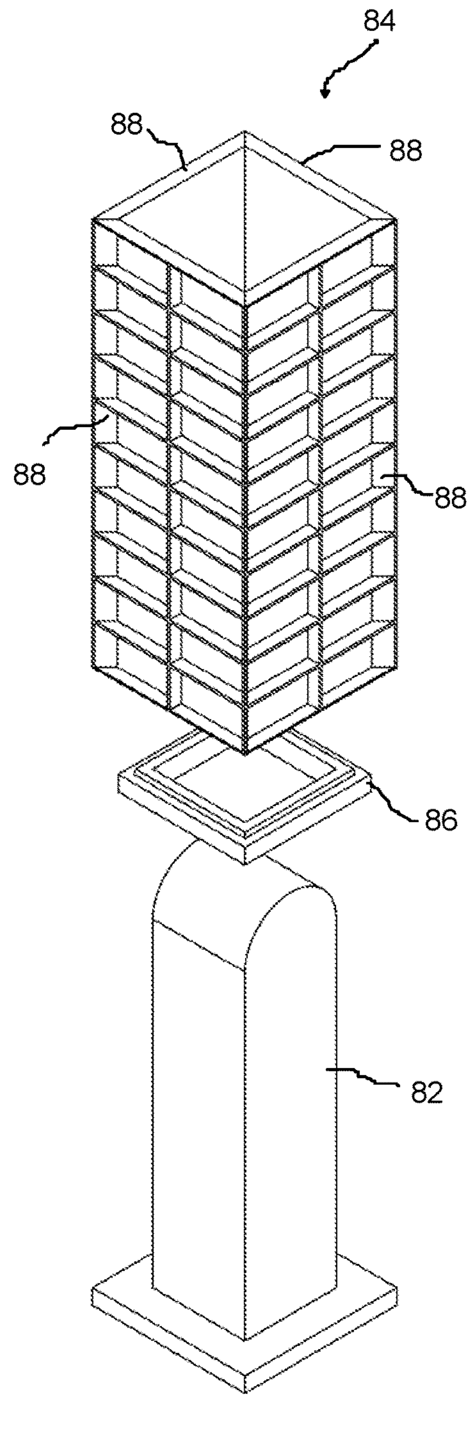
FIG. 15 is an exploded view of a mold for casting the catch basin, according to an embodiment of the present invention, showing an outer mold jacket, an inner mold form, and a mold bottom ring.

Referring now to FIG. 15, there is shown an exploded view of a mold for casting a concrete catch basin 16, according to an embodiment of the present invention. The mold generally includes an inner mold form 82, an outer mold jacket 84, and an optional mold bottom ring 86. Additional aspects of the mold which are known in the art, and thus need no explanation, are not mentioned.

The inner mold form 82 has an outer shape that will form the shape of the inside of the catch basin 16, while the outer mold jacket 84 has an inner shape that will form the shape of the outside of the catch basin 16. In this example, the inner mold form 82 has a rectangular prism at its base and a semicircular prism at its top, which will form a square shaped chamber inside of the catch basin 16, with a curved floor. The mold jacket 84 has four equal sized walls 88 defining an internal space that is rectangular prism shaped, which will form the exterior of the catch basin 16 as a square shape.

When assembled together the outer mold jacket 84 and the inner mold form 82 of the mold create a mold space 90 that is sized and shaped to form the side walls 14 of the concrete catch basin 16, when filled with concrete 92.

A mold bottom ring 86 may optionally be used to close off the mold space 90 in a range of heights relative to the mold 84. In this way, the same mold 84 may be used to cast catch basins 16 with different side wall 14 heights. When used, the mold bottom ring 86 may preferably have surface features 94 adapted to form the desired shape of the open top 18 of the catch basin 16. By way of example, the mold bottom ring 86 may be provided with surface features 94 adapted to form a support 96 for a manhole cover, or a riser (not shown). In embodiments wherein the optional mold bottom ring 86 is omitted, the surface features 94 may be incorporated into the base of the inner mold form 82, for example.

Figure 16:
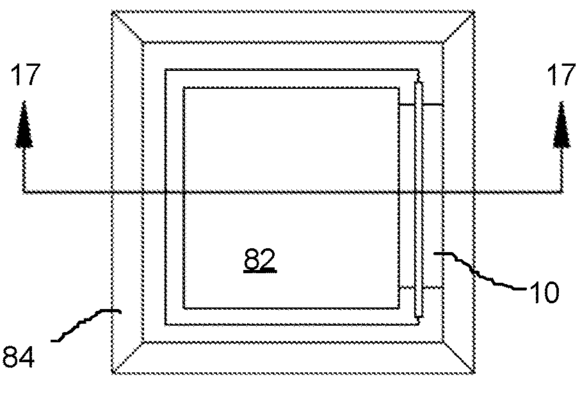
FIG. 16 is a top view of the mold of FIG. 15, assembled in a casting configuration, with the catch basin trap being held in position.
Figure 17:
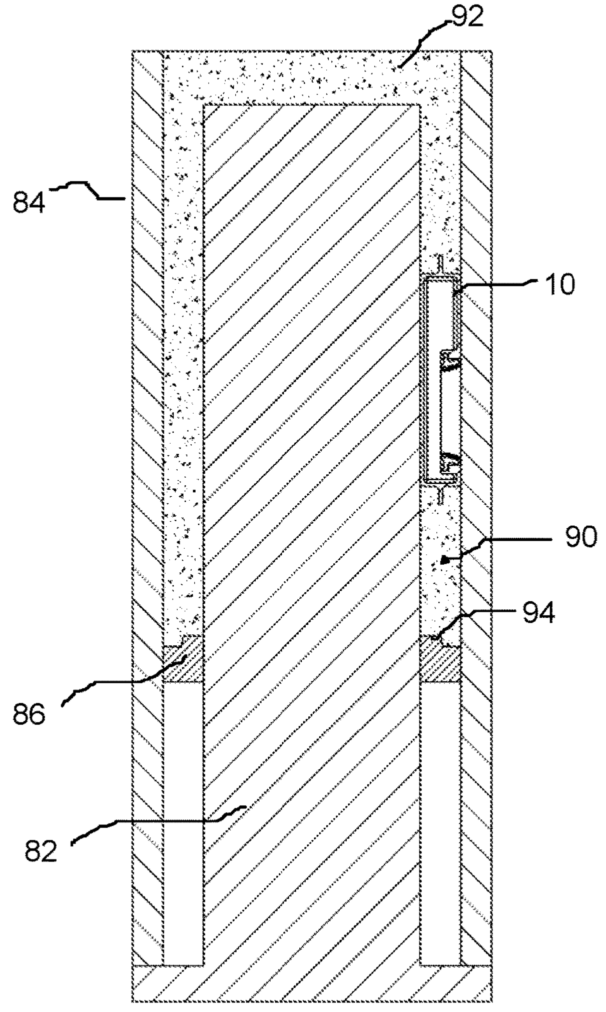
FIG. 17 is a cross-sectional view of the mold taken along line 17-17 of FIG. 16, filled with concrete.

With reference to FIGS. 16 and 17, the mold 84 may be assembled by attaching the mold bottom ring 86 to the inner mold form 82 at an appropriate height to produce a catch basin 16 with side walls 14 at the desired height. The outer mold jacket 84 may then be placed over the inner mold form 82, and the mold bottom ring 86. Next, a rebar cage (not shown) is typically placed in the mold space 90, to rest on the mold bottom ring 86. Before or after placing the rebar cage in the mold space 90, the catch basin trap 10 is preferably attached to the rebar cage to position it at the desired height in the mold space 90, as best seen in FIG. 17. Alternately, the catch basin trap 10 may be attached to the inner mold form 82, or the outer mold jacket 84, to be positioned at the desired height in the mold space 90. However, it is contemplated that persons skilled in the art will recognize other ways in which the catch basin trap 10 may be positioned in a desired orientation, and at the desired height in the mold space 90. For example, it is contemplated that magnets, pins, and/or suspension wires could also be used. What is important is that the catch basin trap 10 is sufficiently immobilized within the mold space 90 to allow the mold space 90 to be filled with concrete 92, completely surrounding the side walls 98 of the catch basin trap 10 (but not the front side 26 or the back side 30), without the catch basin trap 10 shifting, or moving from the desired position before the concrete 92 has had a chance to harden. All such embodiments are comprehended by the present invention.

Preferably, the outer mold jacket 84 and the inner mold form 82 are configured to provide a mold space 90 having a width selected to form the side wall 14 with the desired thickness, and the catch basin trap 10 is sized to and shaped to fit within the mold space 90, when the collapsible outlet pipe connector 40 is in the collapsed configuration. Accordingly, prior to positioning the catch basin trap 10 within the mold space 90, a user will ensure that the collapsible outlet pipe connector 40 is in the collapsed configuration, so that the catch basin trap 10 may fit within the mold space 90.

Figures 18, 19:
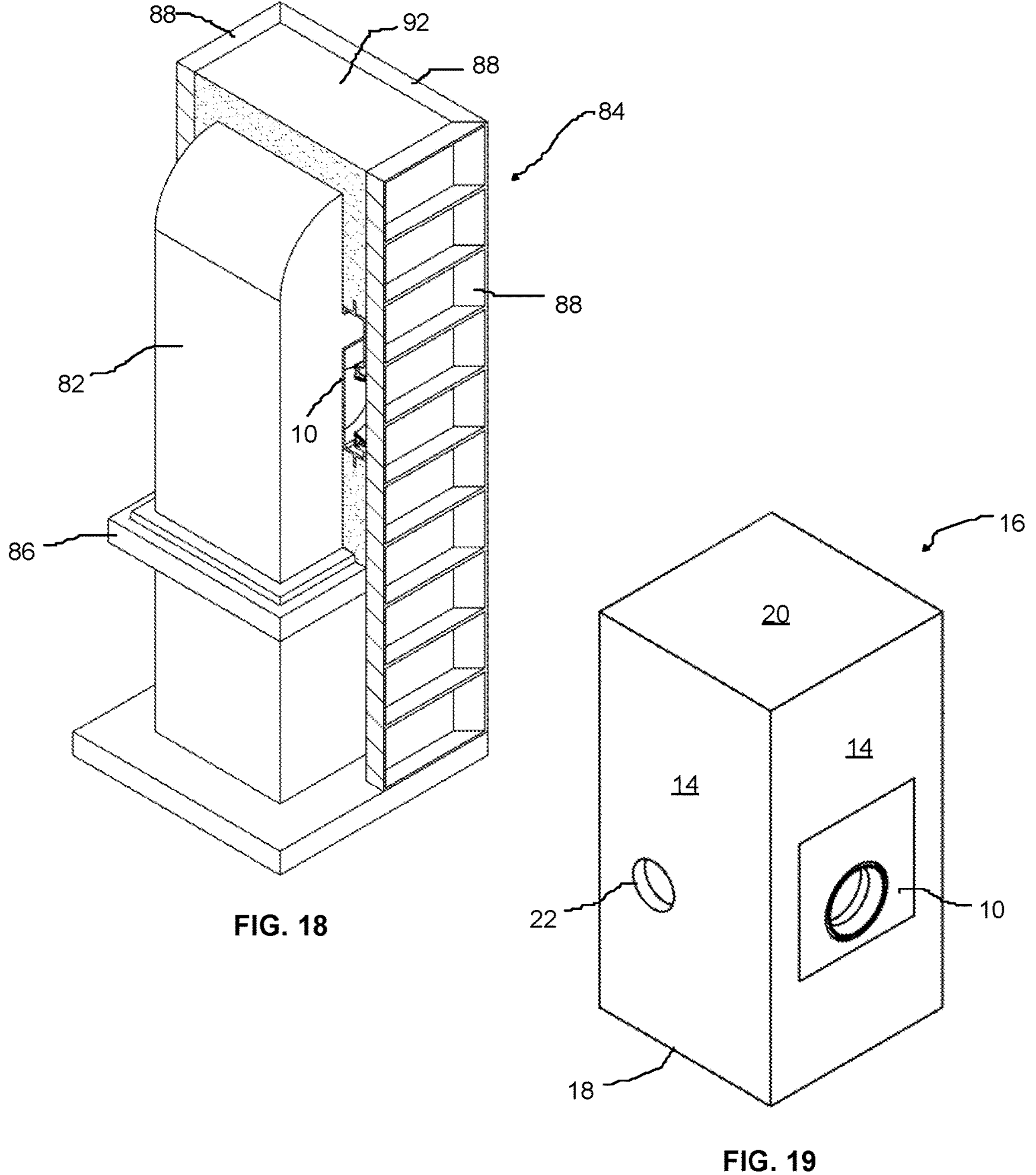
FIG. 18 is a cut-away, perspective view of FIG. 17.
FIG. 19 is a perspective view of a cast concrete catch basin trap, removed from the mold of FIG. 17, after the concrete has been allowed to set for a sufficient period of time.
Figures 20, 21, 22, 23, 24:
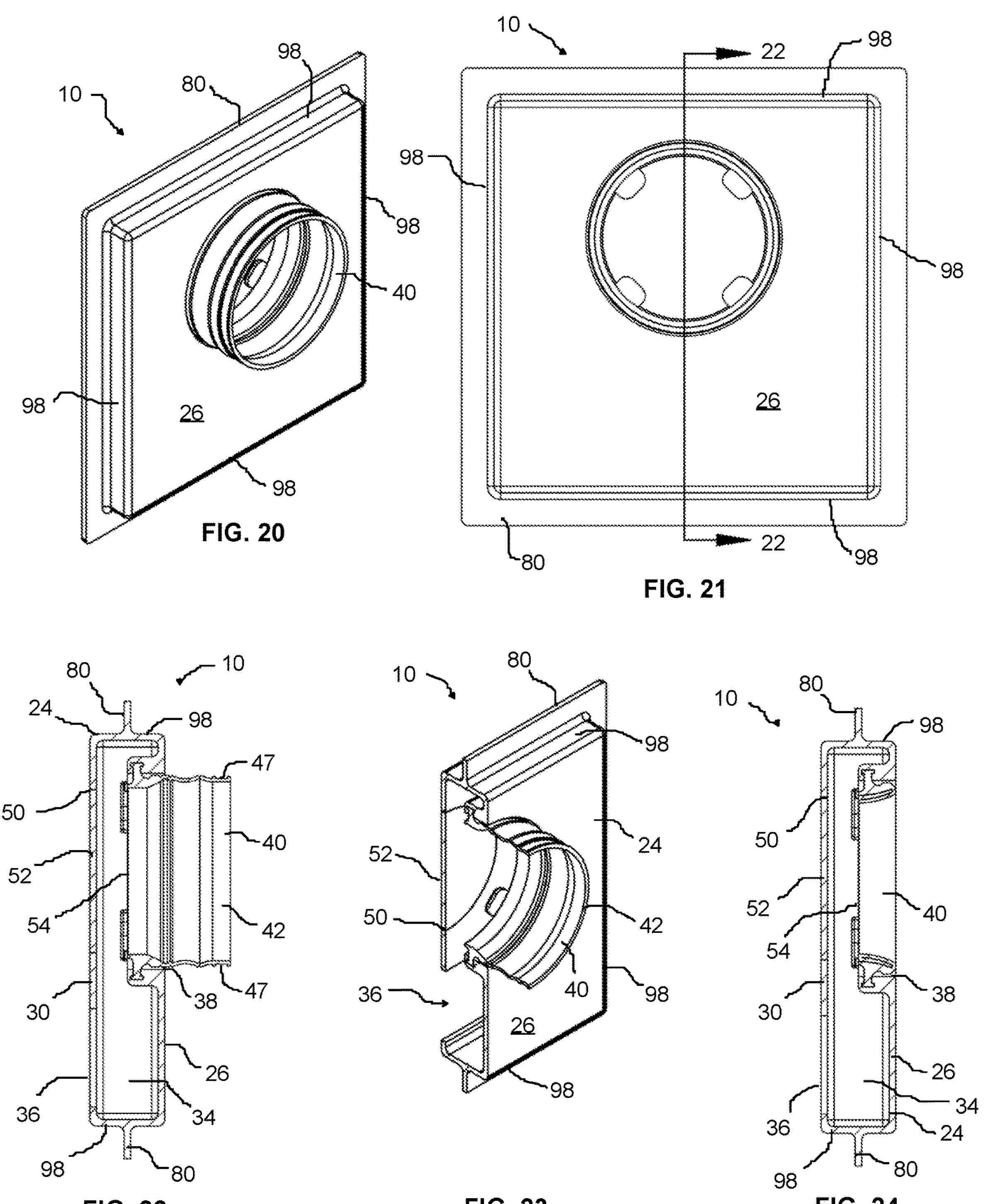
FIG. 20 is a perspective view of a catch basin trap according to another embodiment of the present invention, showing the collapsible, flexible outlet pipe connector in the extended configuration.
FIG. 21 is a front view of the catch basin trap of FIG. 20.
FIG. 22 is a cross-sectional view of the catch basin trap of FIG. 20 taken along line 22-22 of FIG. 21, showing the collapsible, flexible outlet pipe connector in the extended configuration.
FIG. 23 is a cut-away, perspective view of FIG. 22.
FIG. 24 is a cross-sectional view similar to FIG. 22, except that the collapsible, flexible outlet pipe connector is shown in the collapsed configuration.

With continued reference to FIGS. 16 and 17, the side walls 98 of the body 24 of the catch basin trap 10 preferably span the entire width of the mold space 90. In this way, the side walls 98 of the body 24 will block out the concrete 92 being added into the mold during the casting process, to form the opening 12 in the side wall 14 of the catch basin 16, and the upstanding flange 80 extending outwardly from the side walls 98 of the catch basin trap 10 will become embedded in the surrounding concrete 92, as best seen in FIGS. 17 and 18.

As will be appreciated by persons skilled in the art, the concrete used in the casting process can be any dry cast or wet cast concrete typically used in precast concrete municipal infrastructure products. Preferably, the concrete used in the casting process may conform to the standards set out in Canadian Standards Association (CSA) A23.1, A23.2, A23.3, and A23.4.

After the concrete 92 has been allowed to cure for a sufficient amount of time, the hardened catch basin trap 10 may be removed from the mold. With the outer mold jacket 84 removed, the catch basin trap 10 may be lifted off of the inner mold form 82. As shown in FIG. 19, the concrete catch basin 16 is preferably formed upside down in the mold, in which case, the catch basin trap 10 should be oriented upside down when being positioned in the mold space 90. Of course, the cured catch basin trap 10 may be turned right side up for use and installation, and the collapsible outlet pipe connector 40 may be manipulated from the collapsed configuration to the extended configuration, as shown in FIG. 1, for coupling to an outlet pipe 44.

In one embodiment, the dimensions associated with a catch basin trap 10 suitable for a 60 cm by 58 cm opening in the side wall 14 of a catch basin 16 are as follows:

- the width of the body 24 from side wall 98 to side wall 98 is about 58 cm;
- the height of the body 24 from side wall 98 to side wall 98 is about 60 cm;
- the length the upstanding flange 80 extends outwardly from the side wall 98 is about 5 cm, and is about 1 cm thick;
- the depth of the body 24, from front side 26 to back side 30 is about 11.4 cm;
- the diameter of the access opening 50 is about 24.9 cm;
- the diameter of outlet opening 38 is about 30 cm;
- the length and width of the inlet opening 36 are about 30 cm by 15 cm;
- the top of the inlet opening 36 is about 6.0 cm lower than the bottom of the outlet opening 38;
- the collapsible outlet pipe connector 40 extends from the front side 26 about 10 cm, and has an average thickness of about 0.5 cm;
- the outside diameter of the collapsible outlet pipe connector 40 is about 28.4 cm at the discharge end 42, and about 26.5 cm at the inlet end 54; and
- the inside diameter of the collapsible outlet pipe connector 40 is about 27.4 cm at the discharge end 42, and about 25.5 cm at the inlet end 54.

Referring now to FIGS. 20 to 24, there is shown a catch basin trap 10 having a plurality of outlet pipe stop members 100 attached at the outlet opening 38 of the body 24, according to another embodiment of the present invention. The outlet pipe stop members 100 are sized and positioned to prevent the outlet pipe 44 from being inserted so far into catch basin trap 10 through the collapsible outlet pipe connector 40, that it would cause a restriction in the flow of the drainage water along the water flow path 48. Although, four such outlet pipe stop members 100 are shown equally spaced about the outlet opening 38, persons skilled in the art will now appreciate that more or fewer outlet pipe stop members 100 may be used. What is important is that one or more outlet pipe stop members 100 are sized and positioned relative to the outlet opening 38 so as to interfere with the movement of the outlet pipe 44 past the one or more outlet pipe stop members 100, without interfering with the collapsible outlet pipe connector's 40 ability to be manipulated into the collapsed configuration. Preferably, the one or more outlet pipe stop members 100 will prevent the outlet pipe 44 from being inserted so far within the chamber 34 that the flow of the drainage water through the catch basin trap 10 will be restricted. In this example, the four outlet pipe stop members 100 are attached to the outlet opening 38 of the body 24, and extend toward the center of the outlet opening 38, each having a length of 3.8 cm, a width of 6.0 cm, and a thickness of 1.27 cm.

Figure 25:
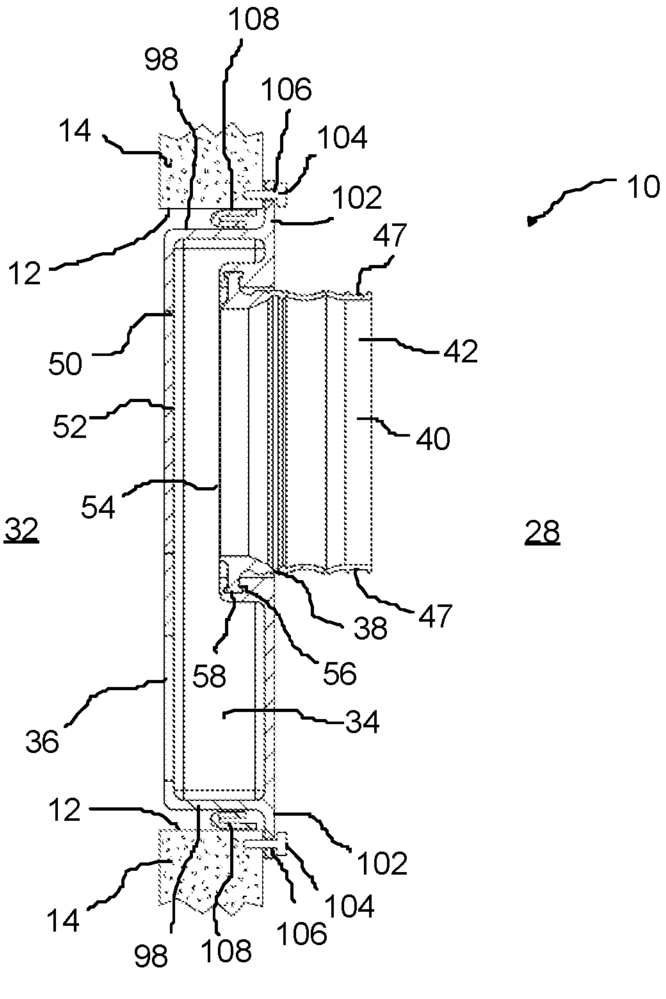
FIG. 25 is a cross-sectional view of the catch basin trap according to another embodiment of the present invention, attached to the opening in the side wall of the catch basin with fasteners.

Referring now to FIG. 25, there is shown a catch basin trap 10 having an attachment means in the form of a mounting flange 102, according to another embodiment of the present invention. In this example, rather than having an upstanding flange 80 for anchoring the catch basin trap 10 to the side wall 14 surrounding the opening 12 as the concrete 92 is curing during concrete casting of the catch basin 16 in a mold, the catch basin trap 10 has the mounting flange 102 for mounting to a precast catch basin 16.

Preferably, the mounting flange 102 extends outwardly from the body 24 of the catch basin trap 10 and is sized and shaped for securing the catch basin trap 10 in place in the opening 12 in the side wall 14. For example, the mounting flange 102 may extend outwardly from the side walls 98 of the body 24 at the front side 26, to allow the mounting flange 102 to be secured to portions of the side wall 14 surrounding the opening 12, with fasteners 104. A plurality of apertures 106 may also be provided in the mounting flange 102, to facilitate mounting of the catch basin trap 10 to the side wall 14. If provided, each aperture 106 may be sized and shaped to allow a fastener 104 to be inserted therethrough to secure into the side wall 14. Additionally, a seal member 108 may be provided between the body 24 and the opening 12 in the side wall 14 of the catch basin 16 to form a watertight seal.

The catch basin trap 10 according to the above embodiment may be easily installed in the opening 12 in the side wall 14 of the precast catch basin 16 by pushing it into the opening 12 from outside 28 of the catch basin 16 until the mounting flange 102 engages the portion of the side wall 14 surrounding the opening 12. Preferably, prior to pushing the body 24 of the catch basin trap 10 into the opening 12, the seal member 108, which in this example is in the form of a square shaped rubber gasket, may be mounted over the side walls 98 of the body 24 to provide a seal between the body 24 of the catch basin trap 10 and the opening 12 in the side wall 14 when the catch basin trap 10 is pushed into the opening 12. If the seal member 108 is employed, it is preferably made of a resilient material configured to have an outer dimension larger than the inner dimension of the opening 12 in its non-deformed state, such that as the catch basin trap 10 is pushed into the opening 12, the seal member 108 is deformed and compressed, to fill any space between the side walls 98 of the body 24 and the opening 12 to form a watertight seal. For example, the seal member 108 may be made of rubber, or a rubber-like material.

The catch basin trap 10 of FIG. 25 may be attached to the opening 12 in the factory and then transported to the work site with the catch basin 16, or it may be attached to opening 12 in the field, after the catch basin 16 and the catch basin trap 10 have been transported to the work site separately. Advantageously, since the collapsible outlet pipe connector 40 is protected within the body 24 of the catch basin trap 10 when in the collapsed configuration, there is less risk of damage to the collapsible outlet pipe connector 40 during transport of the catch basin 16 with the catch basin trap 10 attached. In other words, since the collapsible outlet pipe connector 40 will not stick out of the catch basin 16, when the catch basin trap 10 is attached, it is not susceptible to being crushed, abraded, pinched, pulled, or otherwise damaged, due to insufficient clearance when transporting the catch basins 16, for example.

Once the catch basin 16 is located in the work site, with the catch basin trap 10 attached to the opening 12 in the side wall 14 of the catch basin 16, the collapsible outlet pipe connector 40 can be safely manipulated from the collapsed configuration to the extended configuration for coupling to the outlet pipe 44. Then, the discharge end 42 of the extended collapsible outlet pipe connector 40 may be slid over the inlet end 110 of the outlet pipe 44 to form a watertight coupling. Coupling of the extended collapsible outlet pipe connector 40 to the outlet pipe 44 may require the user to deform the extended collapsible outlet pipe connector 40 from a native extended shape towards a deformed extended shape to align the discharge end 42 of the collapsible outlet pipe connector 40 with the inlet end 110 of the outlet pipe 44. Preferably, the collapsible outlet pipe connector 40 may be configured to allow it to be bent, compressed, and stretched when in the extended configuration.

While reference has been made to various preferred embodiments of the invention other variations, implementations, modifications, alterations and embodiments are comprehended by the broad scope of the appended claims. Some of these have been discussed in detail in this specification and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

The embodiments of the invention in which an exclusive property or privilege is claimed are defined as follows:

1. A catch basin trap for attachment to an opening in a side wall of a catch basin, said catch basin trap comprising:

a body being monolithically formed and having a front side wall for facing outwardly to outside of said catch basin, and a back side wall for facing inwardly to inside of said catch basin, said body defining a chamber located between said front side wall and said back side wall;

an inlet opening in said back side wall of said body for receiving drainage water from said inside of said catch basin;

an outlet opening in said front side wall of said body;

a collapsible outlet pipe connector attached to said outlet opening, said collapsible outlet pipe connector being configured to be manipulated from a collapsed configuration to an extended configuration defining a discharge end adapted for coupling to an outlet pipe positioned outside said catch basin;

a water flow path for said drainage water from said inlet opening to said collapsible outlet pipe connector, via said chamber, and said outlet opening; and an upstanding flange for attaching said catch basin trap to said opening in said side wall of said catch basin, said upstanding flange extending outwardly from said body continuously around a periphery of said body, between said front side wall and said back side wall, said upstanding flange being configured to be embedded in said side wall of said catch basin during concrete casting of said catch basin in a mold to hold said catch basin trap in said opening after said cast concrete catch basin has cured;

wherein said collapsed configuration stows said collapsible outlet pipe connector within said body, and said extended configuration permits watertight coupling of said discharge end of said collapsible outlet pipe connector to said outlet pipe.

2. The catch basin trap as claimed in claim 1, wherein said back side wall of said body comprises an access opening to allow for cleaning of said chamber, said catch basin trap further comprising a cover releasably attached to said access opening for covering said access opening when said catch basin trap is in use.

3. The catch basin trap as claimed in claim 1, wherein an inlet end of said collapsible outlet pipe connector is attached to said outlet opening along its periphery, forming a watertight seal between said outlet opening and said collapsible outlet pipe connector.

4. The catch basin trap as claimed in claim 1, wherein said collapsible outlet pipe connector is configured to roll, or fold back on itself when said collapsible outlet pipe connector is manipulated from said extended configuration to said collapsed configuration; and wherein when said collapsible outlet pipe connector is in said collapsed configuration, no portion of said collapsible outlet pipe connector projects past said front side wall of said body.

5. The catch basin trap as claimed in claim 1, wherein said collapsible outlet pipe connector comprises a plurality of outlet pipe connector sections, each said outlet pipe connector section being joined to an adjacent outlet pipe connector section by a living hinge.

6. The catch basin trap as claimed in claim 5, wherein said living hinge is a ring of material having a thickness that is less than a thickness of the material in the adjacent outlet pipe connector sections.

7. The catch basin trap as claimed in claim 5, wherein one or more of said outlet pipe connector sections are scalloped.

8. The catch basin trap as claimed in claim 1, wherein said collapsible outlet pipe connector comprises a first outlet pipe connector section having said discharge end and a second end, and a second outlet pipe connector section having a first end and a second end; and wherein said second end of said first outlet pipe connector section is attached to said first end of said second outlet pipe connector section by a first living hinge to allow said first outlet pipe connector section to fold back toward said second outlet pipe connector section.

9. The catch basin trap as claimed in claim 8, wherein said collapsible outlet pipe connector further comprises a third outlet pipe connector section having a first end and a second end;

wherein said first end of said third outlet pipe connector section is attached to said second end of said second outlet pipe connector section by a second living hinge, to allow said folded first and second outlet pipe connector sections to fold back toward said third outlet pipe connector section.

10. The catch basin trap as claimed in claim 9, wherein said collapsible outlet pipe connector comprises one or more additional outlet pipe connector sections attached to said second end of said third outlet pipe connector section in series by one or more additional living hinges to allow said folded outlet pipe connector sections to continue folding back toward said next additional outlet pipe connector section in said series.

11. The catch basin trap as claimed in claim 1, wherein said continuous upstanding flange is sized and shaped to form a substantially watertight seal between said body of said catch basin trap and said opening in said side wall of said catch basin.

12. The catch basin trap as claimed in claim 1, further comprising at least one outlet pipe stop member attached to said inlet opening.

13. The catch basin trap as claimed in claim 1 wherein:

the catch basin trap is held in said opening in said side wall; and said collapsible outlet pipe connector is in said collapsed configuration.

14. A concrete catch basin, comprising:

a sidewall having an opening therein;

a catch basin trap attachable to the opening in the side wall of the catch basin, said catch basin trap including:

a body being monolithically formed and having a front side wall for facing outwardly to outside of said catch basin, and a back side wall for facing inwardly to inside of said catch basin, said body defining a chamber located between said front side wall and said back side wall;

an inlet opening in said back side wall of said body for receiving drainage water from said inside of said catch basin;

an outlet opening in said front side wall of said body;

a collapsible outlet pipe connector attached to said outlet opening, said collapsible outlet pipe connector being configured to be manipulated from a collapsed configuration to an extended configuration defining a discharge end adapted for coupling to an outlet pipe positioned outside said catch basin;

a water flow path for said drainage water from said inlet opening to said collapsible outlet pipe connector, via said chamber, and said outlet opening; and an upstanding flange attaching said catch basin trap to said opening in said side wall of said catch basin, said upstanding flange embedded in said side wall of said catch basin; wherein said collapsed configuration stows said collapsible outlet pipe connector within said body, and said extended configuration permits watertight coupling of said discharge end of said collapsible outlet pipe connector to said outlet pipe.

15. A catch basin trap for attachment to an opening in a side wall of a catch basin, said catch basin trap comprising:

a body having a front side wall for facing outwardly to outside of said catch basin, and a back side wall for facing inwardly to inside of said catch basin, said body being monolithically formed and defining a chamber located between said front side wall and said back side wall;

an inlet opening in said back side wall of said body for receiving drainage water from said inside of said catch basin;

an outlet opening in said front side wall of said body;

a collapsible outlet pipe connector attached to said outlet opening, said collapsible outlet pipe connector being configured to be manipulated from a collapsed configuration to an extended configuration defining a discharge end adapted for coupling to an outlet pipe positioned outside said catch basin;

a water flow path for said drainage water from said inlet opening to said collapsible outlet pipe connector, via said chamber, and said outlet opening; and an upstanding flange for attaching said catch basin trap to said opening in said side wall of said catch basin, said upstanding flange extending outwardly from said body continuously around a periphery of said body, between said front side wall and said back side wall, said upstanding flange being configured to have sufficient strength and resiliency to:

support the body and maintain the position of the body during concrete casting of said catch basin in a mold such that the upstanding flange is embedded in the cast concrete and said body is held in said opening after said cast concrete catch basin has cured; and provide a substantially watertight seal between the body and the side wall of the catch basin when embedded in the side wall;

wherein said collapsed configuration stows said collapsible outlet pipe connector within said body, and said extended configuration permits watertight coupling of said discharge end of said collapsible outlet pipe connector to said outlet pipe.

16. The catch basin trap as claimed in claim 15, wherein the body is monolithically formed.

17. The catch basin trap as claimed in claim 16, wherein said back side wall of said body comprises an access opening to allow for cleaning of said chamber, said catch basin trap further comprising a cover releasably attached to said access opening for covering said access opening when said catch basin trap is in use.

18. The catch basin trap as claimed in claim 15, wherein an inlet end of said collapsible outlet pipe connector is attached to said outlet opening along its periphery, forming a watertight seal between said outlet opening and said collapsible outlet pipe connector.

19. The catch basin trap as claimed in claim 15, wherein said collapsible outlet pipe connector is configured to roll, or fold back on itself when said collapsible outlet pipe connector is manipulated from said extended configuration to said collapsed configuration; and wherein when said collapsible outlet pipe connector is in said collapsed configuration, no portion of said collapsible outlet pipe connector projects past said front side wall of said body.

20. The catch basin trap as claimed in claim 15, wherein said collapsible outlet pipe connector comprises a plurality of outlet pipe connector sections, each said outlet pipe connector section being joined to an adjacent outlet pipe connector section by a living hinge.

* * * * *